No. 820,437. PATENTED MAY 15, 1906.
J. PEHRSON.
HOSE AND PIPE COUPLING.
APPLICATION FILED MAR. 18, 1905.
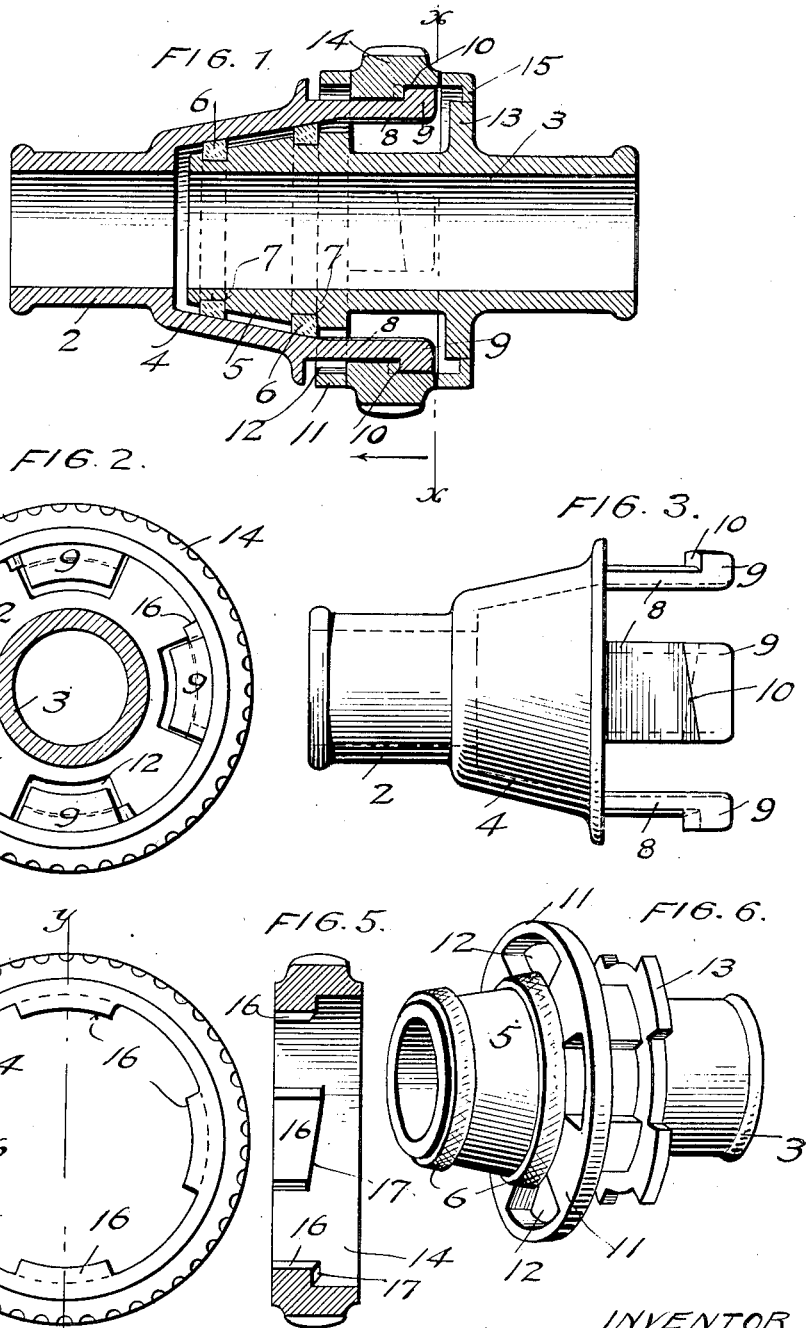

UNITED STATES PATENT OFFICE.

JONAS PEHRSON, OF WILLOWBROOK, CANADA, ASSIGNOR TO INGMER T. AVELSGARD, OF YORKTON, CANADA.

HOSE AND PIPE COUPLING.

No. 820,437.  Specification of Letters Patent.  Patented May 15, 1906.

Application filed March 18, 1905. Serial No. 250,795.

*To all whom it may concern:*

Be it known that I, JONAS PEHRSON, a citizen of the United States, and a resident of Willowbrook, district of Assiniboia, Northwest Territories, Canada, have invented certain new and useful Improvements in Hose and Pipe Couplings, of which the following is a specification.

The object of my invention is to provide a quick-operating coupling and one that is composed of but few parts, and hence inexpensive to manufacture, and is strong and durable.

A further object is to provide a coupling that will form a tight joint when joined together.

The invention consists generally in various constructions and combinations, all as hereinafter described, and particularly pointed out in the claim.

In the accompanying drawings, forming part of this specification, Figure 1 is a longitudinal section of a coupling embodying my invention. Fig. 2 is a transverse section on the line $x\,x$ of Fig. 1. Fig. 3 is a plan view of one of the members of the coupling. Fig. 4 is a side view of the locking-ring. Fig. 5 is a sectional view on the line $y\,y$ of Fig. 4. Fig. 6 is a perspective view of the other member of the coupling.

In the drawings, 2 represents one member of the coupling, and 3 the other member, having ends that are adapted to be secured to the hose in the usual way. The member 2 is provided with a cup-shaped socket 4, formed integral therewith, and the member 3 has a tapered surface 5 at one end that fits within the said socket and is provided with gaskets or packing-rings 6, of rubber, leather, or other suitable material, that fit into annular grooves 7 in said tapered surface and engage the inner surface of the socket 4 when the parts are drawn together and form a tight joint between the members. By providing these narrow-faced packing-rings in place of a cap covering the entire tapered surface 5 I am able to avoid leakage at the joint, which frequently occurs through the accumulation of some foreign matter, such as sand, on the packing-surface and preventing the formation of a tight joint. The socket 4 is provided at intervals with a series of arms 8, having outwardly-turned lugs 9 at their ends with cam-surfaces 10. An annular web 11 is provided on the member 3, having a series of apertures 12 at intervals to receive the ends of the arms 8. The web 11 is preferably formed integral with the member 3, and a web 13 is also provided on the member 3 and spaced from the web 11 and between which a loose locking-ring 14 is arranged, being slipped into place over the web 13 and held in position on one side by the web 11 and on the other by a collar 15, that fits over the web 13 and is secured thereon by brazing or shrinking or in any other suitable way. The ring 14 is of sufficient size to allow the arms 8 to be inserted therein and is provided at intervals with lugs 16, having cam-surfaces 17, that are adapted to engage the surfaces 10 on the arms 8 and exert a lengthwise drawing action on the arms 8 to pull the two members of the coupling together and press the packing-rings snugly against the inner surface of the cup 4. Sufficient space is provided between the lugs 16 on the locking-ring to allow the arms 8 to be thrust into the ring between them, and then a quick partial turn of the ring will bring its lugs into engagement with those on the arms 8 and lock the members of the coupling together. A corresponding movement in the opposite direction will disengage the lugs and allow the parts of the coupling to be separated.

It will be noted that the device is very simple in construction, being composed of but few parts, that are easily and inexpensively made, and that the coupling is very quick in operation and will provide a perfectly tight joint in the hose.

I claim as my invention—

A hose and pipe coupling comprising two members provided with ends adapted to abut on one another, one of said members having a series of arms provided with cam-surfaces, the other member being provided with webs spaced from one another and one of them having apertures through which said arms are inserted, a locking-ring loosely mounted between said webs and into which said arms are thrust, said ring being provided with a series of lugs at intervals provided with cam-surfaces to engage the corresponding surfaces on said arms and draw said members together, and a retaining-collar on one of said webs, substantially as described.

In witness whereof I have hereunto set my hand this 6th day of February, 1905.

JONAS PEHRSON.

Witnesses:
E. A. KALASS,
ANNIE L. PURVIS.